United States Patent
Tusch et al.

(10) Patent No.: US 9,904,979 B2
(45) Date of Patent: Feb. 27, 2018

(54) METHOD OF GENERATING A FRAMED VIDEO SYSTEM

(71) Applicant: Apical Ltd, Cambridge (GB)

(72) Inventors: Michael Tusch, London (GB); Ilya Romanenko, London (GB)

(73) Assignee: Apical Ltd., Cambridge (GB)

( * ) Notice: Subject to any disclaimer, the term of this patent is extended or adjusted under 35 U.S.C. 154(b) by 146 days.

(21) Appl. No.: 14/825,963

(22) Filed: Aug. 13, 2015

(65) Prior Publication Data

US 2016/0057446 A1 Feb. 25, 2016

(30) Foreign Application Priority Data

Aug. 19, 2014 (GB) .................................. 1414743.3

(51) Int. Cl.
*H04N 19/59* (2014.01)
*G06T 3/40* (2006.01)

(52) U.S. Cl.
CPC ...................................... *G06T 3/40* (2013.01)

(58) Field of Classification Search
CPC ....................................................... G06T 3/40
USPC .................................................... 375/240.08
See application file for complete search history.

(56) References Cited

U.S. PATENT DOCUMENTS

| 5,371,539 | A | 12/1994 | Okino et al. | |
|---|---|---|---|---|
| 6,784,927 | B1 | 8/2004 | Itokawa | |
| 2012/0106806 | A1* | 5/2012 | Folta | G06K 9/00295 382/118 |
| 2012/0127329 | A1* | 5/2012 | Voss | H04N 5/23267 348/208.4 |
| 2012/0293687 | A1* | 11/2012 | Karn | H04N 5/23219 348/231.99 |
| 2014/0071287 | A1* | 3/2014 | Tu | H04N 7/181 348/150 |

FOREIGN PATENT DOCUMENTS

| GB | 2411310 A | 8/2005 |
|---|---|---|
| WO | 2011065960 A1 | 6/2011 |

* cited by examiner

*Primary Examiner* — Nguyen Truong
(74) *Attorney, Agent, or Firm* — EIP US LLP

(57) ABSTRACT

A method to frame a video stream is provided. A video stream is captured, then motion of the camera, object presence in the video stream, and position of the object are detected. A framed video stream is generated using a framing in dependence on the motion of the camera and the position of the object. A system for framing a video stream is also provided, wherein the system comprises a camera and a processing unit, and the processing unit comprises at least one processor and at least on memory including computer program instructions to execute a method to frame a video stream.

14 Claims, 5 Drawing Sheets

METHOD OF GENERATING A FRAMED VIDEO SYSTEM

CROSS-REFERENCE TO RELATED APPLICATIONS

This application claims priority under 35 U.S.C. § 119 to GB Patent Application No. 1414743.3, filed Aug. 19, 2014, the entire contents of which is hereby incorporated herein by reference in its entirety.

BACKGROUND OF THE INVENTION

Field of the Invention

The present invention relates to a method for processing a video stream and producing a framed video stream.

Description of the Related Technology

When capturing a video stream of a subject in a scene, framing the scene effectively, for example to produce an aesthetically pleasing composition of the scene, may be difficult, especially if the subject is in motion. For example, the camera operator may not move the camera smoothly, and may be unable to track accurately the object's motion. A preview of the video stream may be available to the user while capturing the video stream but this may be of limited use, for example if bright light is incident on a camera preview screen, or if the camera is held such that the screen is not easily visible.

In addition, objects may not always be present in a video stream. For example, an object may exit an area being filmed, or may be obscured by another object.

A method is required for improving the automatic framing of a video stream.

SUMMARY

According to a first aspect of the present invention, there is provided a method of framing a video stream, the method comprising:
capturing a video stream having frames using a camera, an object being present in the video stream during at least part of the frames;
detecting a motion of the camera;
detecting the presence of the object in the video stream;
determining a position of the object within at least one frame in which the object is present; and
generating a framed video stream using a framing in dependence on the motion of the camera and the position of the object.

The method improves the framing of a video stream by making the framing dependent on two instead of one parameter. For example the framing can follow the motion of the object when the object is present in the video stream, and be stabilized according to the motion of the camera when the object is not present. An aesthetically pleasing composition may thus be obtained while the object is present and also while the object is not present.

The invention further relates to a system for framing a video stream, the system comprising a camera and a processing unit;
wherein the processing unit comprises:
at least one processor; and
at least one memory including computer program instructions,
the at least one memory and the computer program instructions being configured to, with the at least one processor, cause the apparatus to perform a method of:
capturing a video stream having frames using the camera, an object being present in the video stream during at least part of the frames;
detecting a motion of the camera;
detecting the presence of the object in the video stream;
determining a position of the object within at least one frame in which the object is present; and
generating a framed video stream using a framing in dependence on the motion of the camera and the position of the object.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
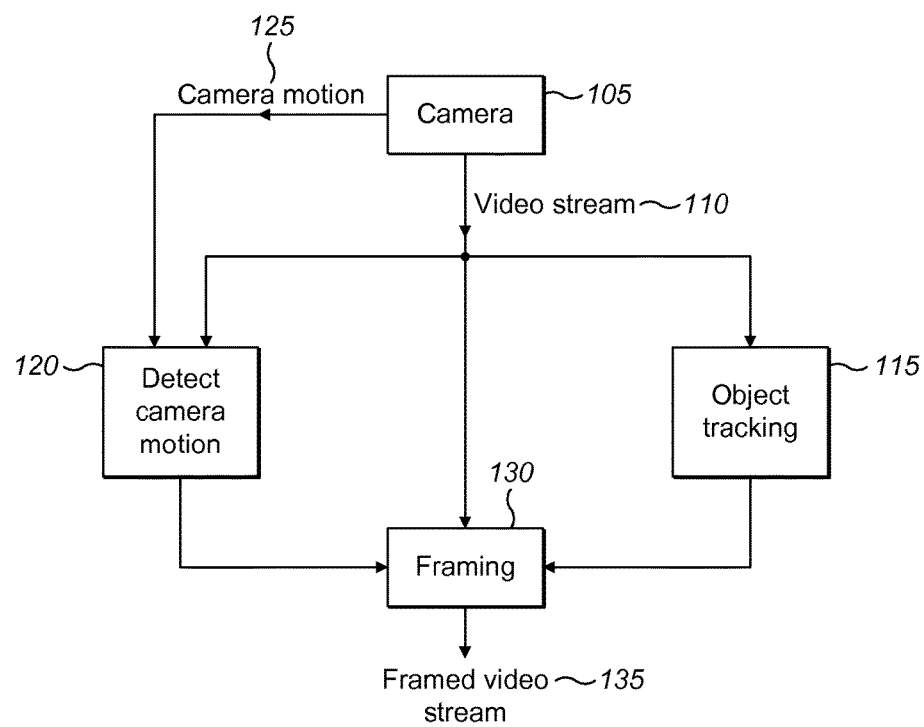
FIG. 1 shows a method of framing a video stream.

FIG. 1 shows schematically a method according to one embodiment, in which a video stream may be automatically framed in order to compensate for camera motion and changing position of an object. Framing may be defined as the process of composing frames of a video stream, generally with the aim of producing an aesthetically pleasing result. For example, framing may have the aim of including certain objects in a frame, or positioning certain objects at defined positions in a frame. A camera 105 captures a video stream 110 comprising frames. An object, which may for example be a person or a part of a person such as a head, is present in the video stream during at least part of the frames, i.e. one frame or a plurality of frames of the video stream. The video stream 110 is analyzed in an object tracking step 115 to detect the presence of the object, and to determine the position of the object in at least one frame in which the object is present.

The detection of the object may for example use known algorithms such as extraction of a histogram of oriented gradients. The histogram of oriented gradients may be analyzed by a feature classifier such as a support vector machine. Use of a support vector machine in this manner is known, for example in "Support-Vector Networks" (Vapnik, Machine Learning, 273-297 (1995), Kluwer Academic Publishers), and involves comparison of part of an image with a template produced by training the algorithm on images containing identified objects. The object detection may, in some embodiments, involve formation of a feature vector from features of the image, to which a trained classifier is applied. Object detection algorithms may output a detection score indicating the confidence of detection, with scores over a threshold value being interpreted as detection of the presence of the object in a frame. Once an object has been detected, its position within a frame can be determined. The position of the object may, for example, be expressed as the center of a box bounding the object.

Motion of the camera 105 with respect to the scene being imaged is detected (step 120). This may be performed by direct analysis of camera motion 125, for example by use of accelerometers mounted on the camera 105. As another example, motion of the camera 105 may be determined by analysis of the video stream 110 using known techniques such as dividing the frames of the video stream 110 into tiles, and determining a motion vector for each tile. Techniques for stabilization of video streams to compensate for camera shake are known in the art. Such techniques include use of an optical stabilization module to move the camera sensor with respect to the lens (for example as described in U.S. Pat. No. 3,942,862) and digital processing including selection of a sub-frame of the full frame whose position relative to the full frame moves in a manner opposing the motion of the camera (for example as described in U.S. Pat. No. 7,956,898).

A framing step 130 generates a framed video stream 135, using a framing in dependence on the motion of the camera 105 and the position of the object. The framing may include cropping and/or scaling the video stream, for example selecting a sub-frame comprising a region of frame of the video stream provided by the camera and discarding the pixels outside that sub-frame. The sub-frame is preferably rectangular, with a specified origin and dimensions. The sequence of sub-frames selected from a sequence of frames from the camera forms a framed video stream 135.

Figure 2:
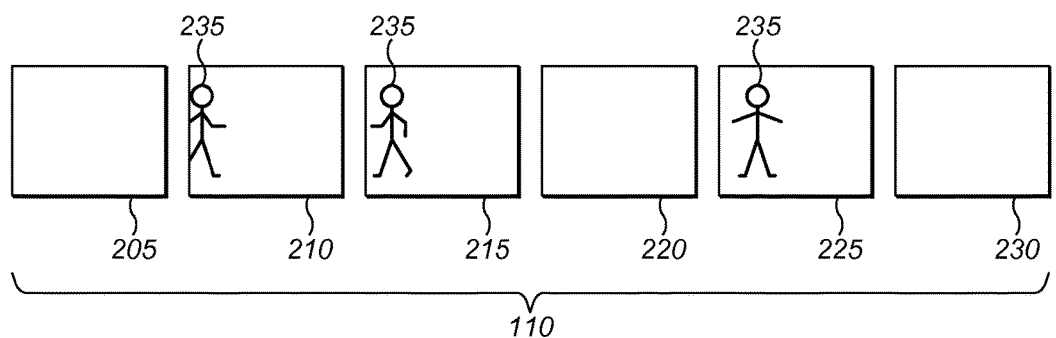
FIG. 2 shows a series of frames comprising a video stream, in which an object is present in some frames and not present in other frames.

FIG. 2 shows a video stream 110 comprising frames 205, 210, 215, 220, 225, 230. An object 235, in this case a person, is present in some frames 210, 215, 225, but not present in other frames 205, 220, 230. According to some embodiments of the method, the framing may depend only or at least partly on the motion of the camera when the object is not present in the video stream, such as in frames 205, 220, 230, and depend only or at least partly on the position of the object when the object is present, such as in frames 210, 215, 225. There are four possible combinations of dependence: only on the motion when no object is present and only on the position when the object is present; at least partly on the motion when no object is present and only on the position when the object is present; only on the motion when no object is present and at least partly on the position when the object is present; and at least partly on the motion when no object is present and at least partly on the position when the object is present.

For example, when the object is present, the framing may depend only on the position of the object, for example such that the object remains in substantially the same position within each frame, such as the middle of the frame. When the object is not present, the video stream may be framed depending on the motion of the camera to compensate for the motion; that is to say the video stream may be stabilized.

According to some aspects of the method, when the object is present in the video stream, the framing may simultaneously depend on the motion of the camera and on the position of the object. The relative degree of dependence on the motion of the camera and position of the object may depend on a relative weighting factor. The relative weighting factor may depend on a detection score assigned to the object by an object detection algorithm. For example if an object is identified with a high degree of certainty, the framing may depend almost entirely on the motion of the object, whereas if the object is identified with a low degree of certainty, the framing may depend to a greater degree on the motion of the camera.

In some embodiments, multiple objects may be identified in a video stream, or in a single frame. The method may include selection of a single one of these objects for determining the framing, the selection being based on its position within a frame of the video stream, or based on the size of the object, or based on the type of the object (for example "person" or "car"). The selection may alternatively be performed by manual selection of an object by a user.

Figure 3:
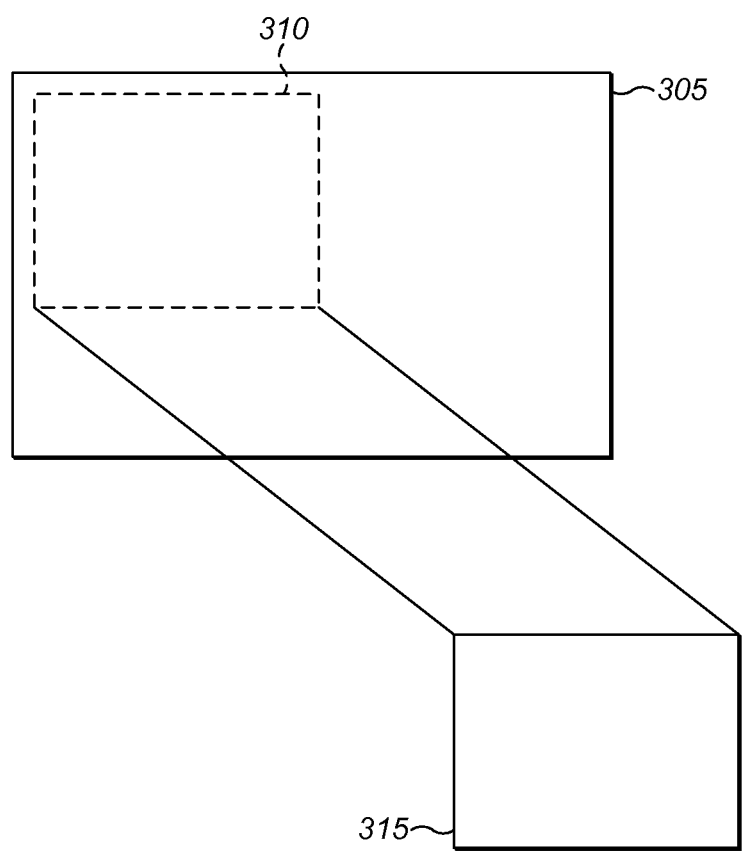
FIG. 3 shows extraction of a crop window in a frame of a video stream, and production of a frame of a framed video stream from the crop window.

In some embodiments, as shown in FIG. 3, a frame 305 of the video stream 110 from the camera 105 has a first, higher resolution than is required in the final framed video stream 135. The framing may then be described as selection of a crop window 310. The area of the frame 305 covered by the crop window 310 corresponds to a frame 315 of the framed video stream 135. In this manner, generation of the framed video stream includes cropping a set of frames of the captured video stream, such that the cropped frames have a second, lower resolution than the original frames. The cropped frame may be up-scaled to a higher resolution, such that the resolution of the frames of the framed video stream is substantially the same as or higher than the resolution of frames of the video stream from the camera.

If the framing is expressed as a crop window 310, the position of the crop window 310 in a given frame may be expressed as the displacement of the crop window 310 with respect to the position of the crop window in the previous frame. The relative contributions of the camera motion and the object position to the framing may, for example, be combined as follows, where $\Delta x$ is the horizontal displacement and $\Delta y$ is the vertical displacement of the crop window 310 with respect to the position in the previous frame:

$$\Delta x = \alpha F_1(\delta'_x) + (1-\alpha) F_2(-\delta_x)$$

$$\Delta y = \alpha F_1(\delta'_y) + (1-\alpha) F_2(-\delta_y)$$

where $\delta'_x$ and $\delta'_y$ are the horizontal and vertical displacements of the object from its position in the previous frame; $\delta_x$ and $\delta_y$ are the amount of horizontal and vertical motion of the camera relative to the previous frame; $F_1$ and $F_2$ are spatial/temporal filters which may be applied to the motion of the camera and/or to the motion of the object to smooth the motion of the crop window between frames; and $\alpha$ is the relative weighting factor as described above.

In some aspects of the invention, the spatial/temporal filters are not applied. This is equivalent to setting:

$$F_1(\delta'_x) = \delta'_x$$

$$F_1(\delta'_y) = \delta'_y$$

$$F_2(-\delta_x) = -\delta_x$$

$$F_2(-\delta_y) = -\delta_y$$

in the equations above. In aspects in which spatial/temporal filters $F_1$, $F_2$ are applied, they may be applied to frames in which the object is present, or frames in which the object is not present, or both, in order to smooth the motion of the crop window between frames. An example of such a filter is a linear temporal filter $F_{LT}$, which may be defined as:

$$F_{LT}(x(t)) = \beta x(t) + (1-\beta) x(t-1)$$

where $x(t)$ is the position of the crop window in frame t, and $\beta$ is a temporal smoothing parameter. A similar filter may be applied to the motion of the camera. A smaller value of the temporal smoothing parameter causes a smoother motion of the crop window between frames. More complex temporal filters, such as a non-linear filter with a stability region, or a spatio-temporal filter which takes into account the size of the displacement, may alternatively be incorporated into the method.

In some embodiments, the relative weighting factor is typically equal to 1 if an object is detected in a given frame, and equal to 0 otherwise, with the consequence that the framing is dependent entirely on the position of the object when the object is present, and entirely on the motion of the camera when the object is not present. In other embodiments, in frames in which the object is detected, the relative weighting factor may have a value between 0 and 1. This provides a balance between tracking object position and compensating for camera motion. In such embodiments, a higher value of the relative weighting factor causes a greater degree of dependence on the position of the object, and a lower value of the relative weighting factor causes a greater degree of dependence on the motion of the camera. Spatial and/or temporal filtering may be applied when determining the weighting factor, for example to effect a smooth transition between dependence of framing on position of the object and dependence on motion of the camera.

Figure 4:
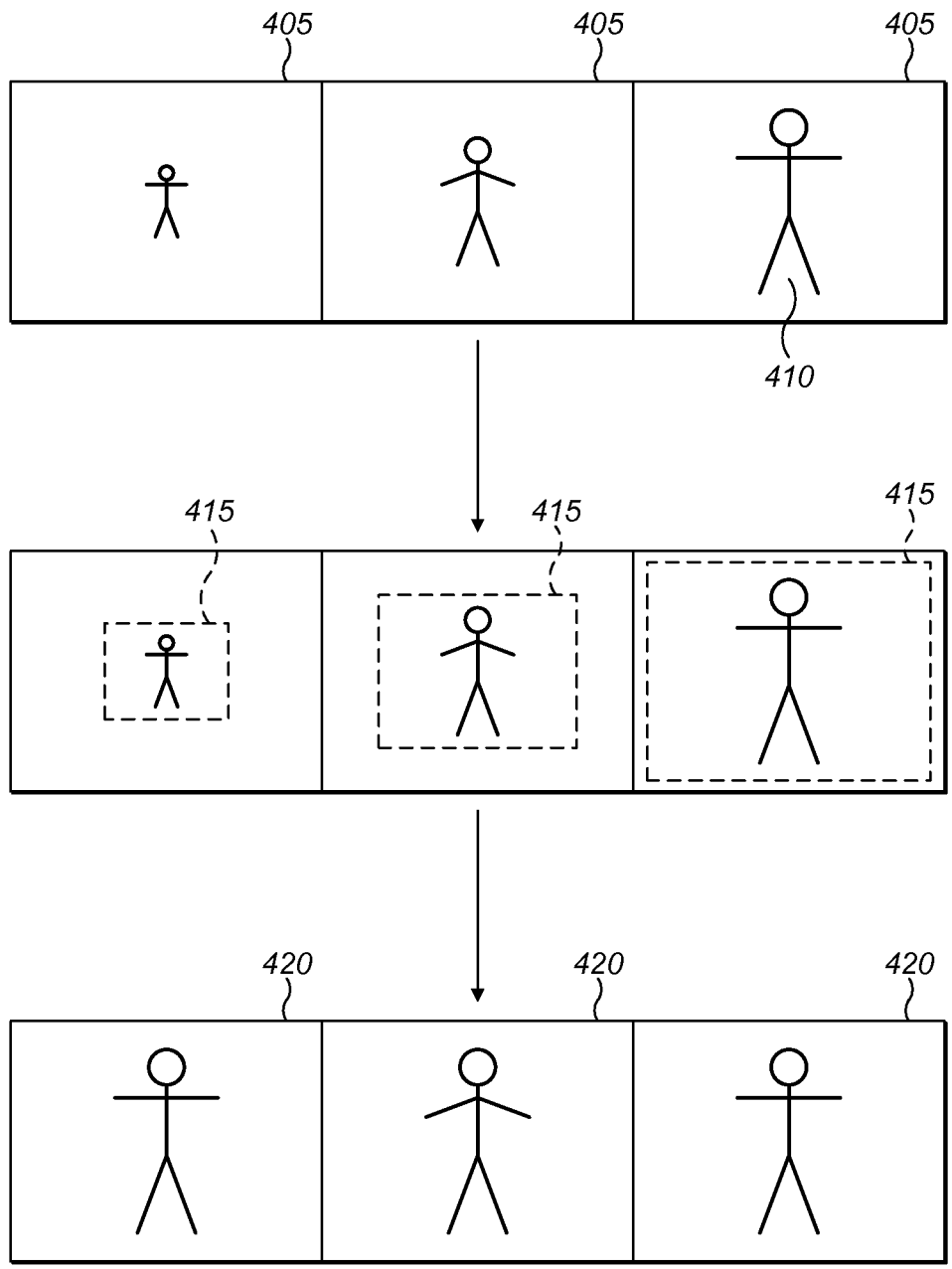
FIG. 4 shows generation of a framed video stream in which the framing depends on the size of an object in the video stream.

The framing may include scaling the crop window by a scaling factor, which may be dependent on the size of the object. In some embodiments, this may be implemented as depicted in FIG. 4. Frames 405 of the video stream 110 captured by the camera 105 include an object 410, in this case a person, the size of which varies between frames. For example, the person may move closer to the camera. The framing includes, apart from any change in position of crop windows, selecting crop windows 415 dependent on the size of the object, and scaling these such that the size of the object in frames 420 of the framed video stream is substantially equal to a predetermined size with respect to the frames 420 of the framed video stream 135. For example, the method may scale the crop windows 415 such that the size of the object in frames 420 of the framed video stream 135 remains constant within a predetermined threshold, such as 10% of the height or width of the crop window.

The scaling factor, here termed Z, may be defined as:

$$Z = \gamma S$$

where $\gamma$ is a scaling parameter and S is a measure of the size of the detected object, for example its height or width. It may be desirable to apply spatial or temporal filtering to the scaling factor in order to ensure smooth transitions of the crop window between frames. In such embodiments, the scaling factor may be defined as:

$$Z = \alpha F(\gamma S)$$

where $\alpha$ is equal to 1 if the object is present in a given frame and equal to 0 otherwise, and F is a filter, for example a linear temporal filter as described above.

According to some aspects of the invention, the framing may include positioning the object in a position offset from the center of a frame, in which the offset may depend on the orientation of the object. The orientation may be identified by the application of multiple classifiers to the video stream, each classifier being trained to identify an object in a different orientation. For example, classifiers may be used which are trained to identify a human head oriented to the right or to the left with respect to the camera or facing the camera. These classifiers may typically output a detection score, with the classifier with the highest score indicating the best estimate of the orientation of the object.

Figure 5:
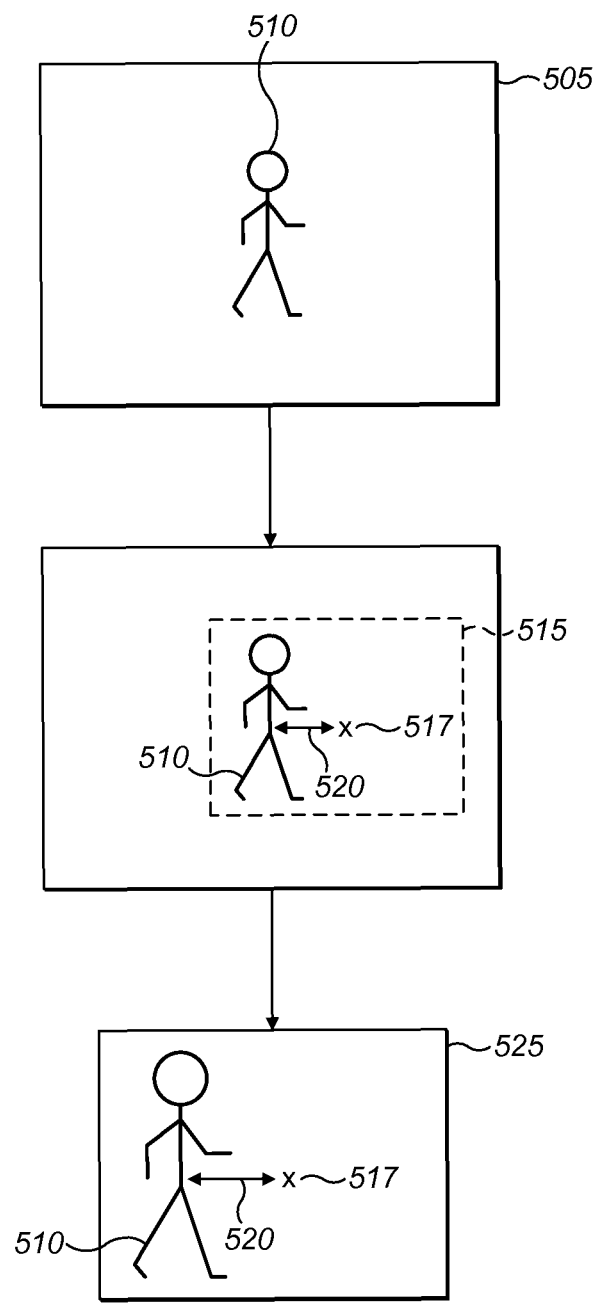
FIG. 5 shows generation of a frame of a framed video stream in which the framing depends on the orientation of an object in the video stream.

In an exemplary embodiment, to obtain an aesthetically pleasing composition it may be desirable to position a right-facing person not in the center but to the left of the center of a frame of the framed video stream 135 and vice versa. FIG. 5 shows a framing according to some such embodiments. A frame 505 of the video stream 110 from the camera 105 contains an object 510, in this case a person facing to the right of the frame. A crop window 515 is positioned such that the person is positioned to the left of the center 517 of the crop window by an offset 520. The corresponding frame 525 of the framed video stream 135 thus contains the object 510 having the offset 520 to the left of the center of the frame. The offset may be expressed as a modification of the co-ordinates of the center of the crop window $(X, Y)$ to $(X+X_0, Y+Y_0)$, where $X_0$ and $Y_0$ are the offsets. For example, if the object is a person, it may be desirable to offset the crop window by a third of the width of the crop window if the person is facing left or right, to offset the crop window by half of the height of the crop window if the person is facing up or down, and not to offset the crop window if the person is facing the camera. If the width of the crop window is h and the height of the crop window is v, this may be expressed as:

$$X_0 = h/3 \text{ if person is facing left;}$$

$$X_0 = -h/3 \text{ if person is facing right;}$$

$$X_0 = 0 \text{ if person is facing camera;}$$

$$Y_0 = v/2 \text{ if person is facing up; and}$$

$$Y_0 = -v/2 \text{ if person is facing down.}$$

Figure 6A:
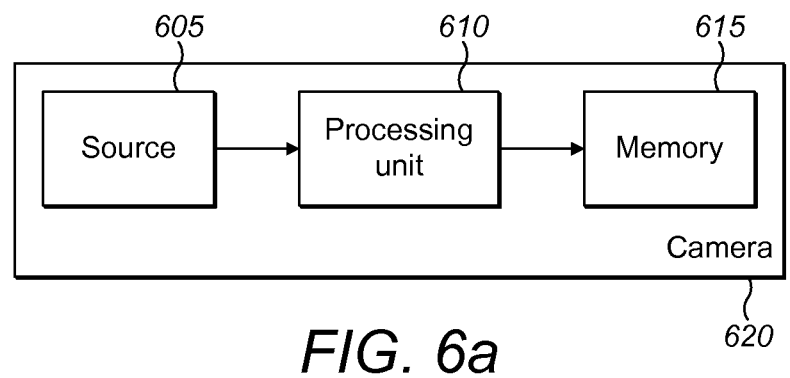
FIGS. 6a and 6b show two systems implementing the method of FIG. 1.

Two exemplary embodiments of a system for carrying out the above described methods are shown in FIG. 6. FIG. 6a shows a source 605 providing a video stream, which may for example be the image sensor of a digital camera. The source 605 is connected to a processing unit 610. The processing unit is also connected to at least one memory 615 containing computer program instructions, configured to carry out the method as described above and to produce a framed video stream as described above. The source 605, processing system 610 and memory 615 form a system 620 for framing a video stream; the components of the system may be integrated in a single apparatus 620, e.g. a camera.

Figure 6B:
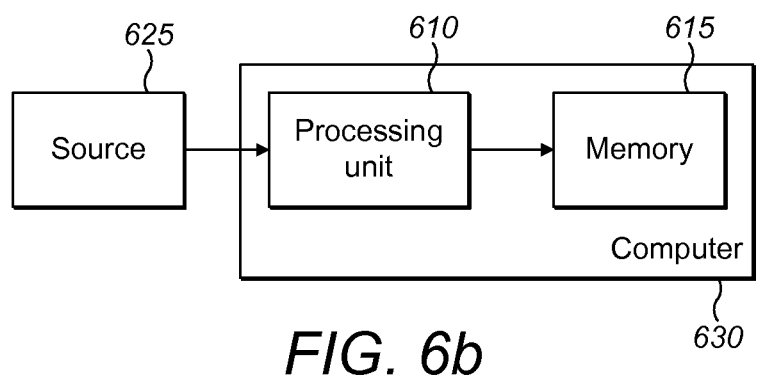

FIG. 6b shows a camera 625 providing a video stream. The camera is connected to a processing unit 610 and a memory 615 as described above. The processing unit 610 and memory 615 may be included within a computer 630 separate from the camera.

The above embodiments are to be understood as illustrative examples of the invention. Further embodiments of the invention are envisaged. For example, the source may be a memory within a computer, and the source 605, processing system 610 and memory 615 may all be contained within a computer. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of framing a video stream, the method comprising:
   capturing a video stream having frames using a camera, an object being present in the video stream during at least part of the frames;
   detecting a motion of the camera;
   detecting the presence of the object in the video stream;
   determining a position of the object within at least one frame in which the object is present; and
   generating a framed video stream using a framing in dependence on the motion of the camera and also in dependence on the position of the object, a relative degree of dependence on the motion of the camera and dependence on the position of the object being dependent on a relative weighting factor, the relative weighting factor depending on a detection score assigned to the object by the detecting the presence of the object.

2. The method according to claim 1, wherein the dependence is determined by the presence of the object such that:
   the framing is in dependence on the motion of the camera when the object is not present in the video stream; and
   the framing is in dependence on the position of the object when the object is present in the video stream.

3. The method according to claim 2, wherein the framing is simultaneously dependent on the motion of the camera and on the position of the object when the object is present in the video stream.

4. The method according to claim 1, further comprising applying spatial filtering or temporal filtering to determining the relative weighting factor.

5. The method according to claim 1, further comprising applying spatial or temporal filtering to the motion of the camera or to the position of the object.

6. The method according to claim 1, wherein the framing comprises scaling the video stream for obtaining a size of the object in the framed video stream substantially equal to a predetermined size with respect to a size of frames of the framed video stream.

7. The method according to claim 1, wherein the generating the framed video stream comprises positioning the object in a position offset from a centre of frames of the framed video stream, the offset depending on an orientation of the object.

8. The method according to claim 1, wherein a set of frames of the captured video stream have a first resolution, and wherein the generation of the framed video stream comprises cropping the set of frames of the captured video stream, such that frames of the framed video stream have a second resolution lower than the first resolution.

9. The method according to claim 1, wherein the object is a person.

10. A system for framing a video stream, the system comprising a camera and a processing unit;
    wherein the processing unit comprises:
    at least one processor; and
    at least one memory including computer program instructions, the at least one memory and the computer program instructions being configured to, with the at least one processor, cause the apparatus to:
      capture a video stream having frames using the camera, an object being present in the video stream during at least part of the frames;
      detect a motion of the camera;
      detect the presence of the object in the video stream;
      determine a position of the object within at least one frame in which the object is present; and
      generate a framed video stream using a framing in dependence on the motion of the camera and also in dependence on the position of the object, a relative degree of dependence on the motion of the camera and dependence on the position of the object being dependent on a relative weighting factor, the relative weighting factor depending on a detection score assigned to the object by the detecting the presence of the object.

11. The system according to claim 10, wherein the camera and the processing unit are integrated in a single apparatus.

12. The method according to claim 1, further comprising applying spatial filtering and temporal filtering to determining the relative weighting factor.

13. The method according to claim 1, further comprising applying spatial filtering and temporal filtering to the motion of the camera or to the position of the object.

14. The method according to claim 1, further comprising applying spatial filtering and temporal filtering to the motion of the camera and to the position of the object.

* * * * *